United States Patent [19]

Zschalich et al.

[11] Patent Number: 5,296,212
[45] Date of Patent: Mar. 22, 1994

[54] METHOD FOR THE REMOVAL OF SULFUR FROM PHOSPHORUS

[75] Inventors: Arndt Zschalich, Zscherndorf; Rudolf Schumann, Raguhn, both of Fed. Rep. of Germany

[73] Assignee: Chemie AG Bitterfeld-Wolfen, Bitterfeld, Fed. Rep. of Germany

[21] Appl. No.: 871,422

[22] Filed: Apr. 21, 1992

[51] Int. Cl.$^5$ ............................................. C01B 25/047
[52] U.S. Cl. .................................................. 423/322
[58] Field of Search ........................................ 423/322

[56] References Cited

U.S. PATENT DOCUMENTS

| | | | |
|---|---|---|---|
| 2,123,554 | 7/1938 | Klosky | 423/322 |
| 2,537,078 | 1/1951 | Miller | 423/322 |
| 3,780,164 | 12/1973 | Muller et al. | 423/322 |
| 4,299,806 | 11/1981 | Kuck et al. | 423/322 |

FOREIGN PATENT DOCUMENTS

| | | | |
|---|---|---|---|
| 611961 | 1/1961 | Canada | 423/322 |
| 76482 | 10/1970 | Fed. Rep. of Germany . | |
| 312829 | 10/1971 | U.S.S.R. | 423/322 |
| 919989 | 4/1982 | U.S.S.R. | 423/322 |

*Primary Examiner*—Wayne Langel
*Attorney, Agent, or Firm*—Jordan and Hamburg

[57] ABSTRACT

A method for purifying white phosphorus contaminated with sulfur bound thereto involves contacting contaminated white phosphorus with water, steam, aqueous solutions, or vaporized aqueous solutions, preferably alkaline, to remove bound sulfur from the phosphorus. The purified phosphorus is characterized by a sulfur content as low as 50 ppm.

9 Claims, No Drawings

METHOD FOR THE REMOVAL OF SULFUR FROM PHOSPHORUS

BACKGROUND OF THE INVENTION

The invention relates to a method for purifying phosphorus, as a result of which the area of application of products produced from phosphorus, can be expanded due to a great reduction in sulfur content.

Generally, organic impurities up to 0.3% are contained in technical grade white phosphorus. These impurities interfere in some areas of application with further processing and must therefore be removed before subsequent reaction. According to GDR patent 76,482, removal of the interfering organic impurity is possible by a treatment of the phosphorus with sulfuric acid. The phosphorus to be purified is intensively mixed briefly with highly concentrated sulfuric acid in a special apparatus. During this mixing, an emulsion is formed. In order to separate the purified phosphorus rapidly from the emulsion, the latter is passed into warm water. A rapid separation of the phosphorus is required in order to avoid explosive reactions between phosphorus and sulfuric acid. To remove enclosed sulfuric acid, the phosphorus is passed through a packed column. Due to its higher specific gravity, the phosphorus sinks countercurrently to the warm water. With this method, the phosphorus is largely freed from organic impurities.

A relatively large increase in sulfur content of the phosphorus, purified in this manner, is due to the reaction of the sulfuric acid with the phosphorus during the purification method and is disadvantageous for some applications. In general, concentrations of 500 ppm and, in rare cases, concentrations as high as 2,000 ppm are attained. In a side reaction, a small portion of the sulfuric acid is reduced by the phosphorus and therefore leads to an increase in the sulfur content of the phosphorus. According to an older purification method, the phosphorus is also treated with concentrated sulfuric acid. The sulfuric acid, however, is separated off on the basis of its higher specific gravity and without the addition of water. This method also leads to a large increase in the sulfur content of the phosphorus. With this procedure, sulfur contents of more than 500 ppm have been detected. In certain applications, the high sulfur content leads to undesirable side reactions. For example, hydrogen sulfide is formed as a by-product when phosphorus is converted to phosphane. It is also disturbing that such phosphorus, upon contact with water, gives off poisonous hydrogen sulfide and thereby makes handling and transport more difficult. No method for removing sulfur from white phosphorus, which is suitable for industrial application, is described in the literature. Since phosphorus is an extremely reactive chemical, problems were to be expected with the removal of sulfur.

SUMMARY OF THE INVENTION

It is an object of the invention to provide a method, easily realizable technically, for removing sulfur from white phosphorus, which has been purified with sulfuric acid.

Surprisingly, it has been found that sulfur, remaining in phosphorus after purification of the phosphorus with concentrated sulfuric acid, can easily and rapidly be removed by a treatment of the liquid phosphorus with water, aqueous solutions or the vapors of these liquids at temperatures above the melting point of phosphorus. As expected, the reaction time can be shortened at higher temperatures. Treatment with a weakly alkaline washing liquid is particularly advantageous for the removal of the sulfur. Strongly alkaline solutions are less suitable because of the greater formation of phosphane.

This method of reducing the sulfur content can also be employed if, after the sulfuric acid treatment, the acid has been separated off because of its higher specific gravity and without the addition of water or if the phosphorus contains sulfur for other reasons.

DESCRIPTION OF THE PREFERRED EMBODIMENTS

The invention is explained below by means of three examples.

EXAMPLE 1

White phosphorus (80 g), which had been treated with concentrated sulfuric acid to remove organic impurities and contained 25 ppm of oil and 1,500 ppm of sulfur, was contacted intensively for 1.5 hours at 75° C. with 150 mL of water in a sulfiting flask, which was equipped with a reflux condenser, thermometer and stirrer and had a capacity of 500 mL. After the phosphorus had cooled down, the water was removed. After the treatment, the phosphorus contained 25 ppm of oil and 40 ppm of sulfur.

EXAMPLE 2

In each case, 100 g of white phosphorus, which had been treated with concentrated sulfuric acid to remove organic impurities and contained 20 ppm of oil and 1250 ppm or 1600 ppm of sulfur, was treated in the same apparatus as in Example 1 with an aqueous solution.

The following cleaning effects were achieved:

| Dissolved Material | Concentration % | Washing Solution in mL | pH of Washing Solution | Treatment Temp. | Treatment Time h | Sulfur Content Before Treatment | Sulfur Content After Treatment ppm |
|---|---|---|---|---|---|---|---|
| $NaHCO_3$ | 1.0 | 100 | 9 | 75 | 1.0 | 1600 | <10 |
| $NaHCO_3$ | 1.0 | 33 | 9 | 60 | 0.75 | 1600 | 40 |
| $NaHCO_3$ | 1.0 | 33 | 9 | 90 | 0.5 | 1600 | 25 |
| $NaCH_3COO$ | 3.0 | 100 | 10 | 75 | 1.0 | 1600 | 10 |
| NaCl | 3.0 | 100 | 6 | 75 | 1.5 | 1250 | 50 |
| $H_2O_2$ | 0.5 | 100 | 5 | 75 | 1.0 | 1250 | 140 |
| $NH_4OH$ | 1.0 | 100 | 10 | 75 | 1.0 | 1250 | <10 |
| HCl | 3.0 | 100 | 1 | 75 | 1.0 | 1250 | 140 |
| $CH_3OH$ | 10.0 | 100 | 6 | 60 | 1.0 | 1600 | 60 |

EXAMPLE 3

White phosphorus (100 g), which had been treated with concentrated sulfuric acid to remove organic impurities and contained 20 ppm of oil and 500 ppm of sulfur, was continuously passed over a period of 1 hour into a packed column (diameter 32 mm, length 1,500 mm). The phosphorus, dripping down, was washed countercurrently and uniformly with steam, which was generated by evaporating 80 g of water. The phosphorus, so treated, was drawn off into a container at the bottom of the column. It had a sulfur content of 130 ppm.

We claim:

1. A method for purifying white phosphorus contaminated with sulfur bound thereto, comprising contacting said contaminated white phosphorus with a wash fluid at a temperature above the melting point of phosphorus for a time sufficient to remove said bound sulfur from said phosphorus, said wash fluid being selected from the group consisting of alkaline liquid aqueous solutions and alkaline vaporized aqueous solutions.

2. A method as in claim 1, wherein said temperature is between 60° C. and 90° C.

3. A method as in claim 1, further comprising contacting white phosphorus with concentrated sulfuric acid to remove organic impurities from said phosphorus prior to contacting said phosphorus with said wash fluid.

4. A method as in claim 1, wherein said time is between 30 and 90 minutes.

5. A method for purifying white phosphorus contaminated with sulfur bound thereto, comprising contacting said contaminated white phosphorus with a wash fluid at a temperature above the melting point of phosphorus for a time sufficient to remove said bound sulfur from said phosphorus, said wash fluid being steam.

6. A method as in claim 5, wherein said temperature is between 60° C. and 90° C.

7. A method as in claim 5, further comprising contacting white phosphorus with concentrated sulfuric acid to remove organic impurities from said phosphorus prior to contacting said phosphorus with said wash fluid.

8. A method as in claim 5, wherein said time is between 30 and 90 minutes.

9. A method for purifying white phosphorus contaminated with sulfur bound thereof, comprising contacting said contaminated white phosphorus with a wash fluid at a temperature above the melting point of phosphorus for a time sufficient to remove said bound sulfur from said phosphorus, said wash fluid being steam and said contacting comprising contacting said phosphorus countercurrently with said steam.

* * * * *